United States Patent
Ikeda et al.

(10) Patent No.: US 11,766,777 B2
(45) Date of Patent: Sep. 26, 2023

(54) ROBOT, METHOD, AND MANIPULATING SYSTEM

(71) Applicant: Toyota Jidosha Kabushiki Kaisha, Toyota (JP)

(72) Inventors: Takuya Ikeda, Nagakute (JP); Koji Terada, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 225 days.

(21) Appl. No.: 16/710,656

(22) Filed: Dec. 11, 2019

(65) Prior Publication Data
US 2020/0189097 A1 Jun. 18, 2020

(30) Foreign Application Priority Data
Dec. 14, 2018 (JP) .................................. 2018-234338

(51) Int. Cl.
*B25J 9/16* (2006.01)
*B25J 19/02* (2006.01)

(52) U.S. Cl.
CPC ............. *B25J 9/1612* (2013.01); *B25J 9/163* (2013.01); *B25J 9/1669* (2013.01); *B25J 9/1697* (2013.01); *B25J 19/021* (2013.01)

(58) Field of Classification Search
CPC ......... B25J 9/1697; B25J 9/021; B25J 9/1612
USPC ................................................. 700/245–264
See application file for complete search history.

(56) References Cited

U.S. PATENT DOCUMENTS

| | | | |
|---|---|---|---|
| 9,687,982 B1* | 6/2017 | Jules ....................... | B25J 9/1612 |
| 10,207,402 B2* | 2/2019 | Levine ................... | G06N 3/045 |
| 10,464,212 B2* | 11/2019 | Gupta .................... | B25J 13/006 |
| 10,864,631 B2* | 12/2020 | Davidson ............... | B25J 9/1612 |
| 10,981,272 B1* | 4/2021 | Nagarajan .............. | B25J 9/1669 |
| 2013/0226344 A1* | 8/2013 | Wong .................... | G05D 1/0242 700/258 |
| 2013/0346348 A1* | 12/2013 | Buehler ................ | G05B 19/423 901/31 |
| 2016/0349730 A1* | 12/2016 | Fair ........................ | B25J 9/1612 |
| 2017/0252922 A1* | 9/2017 | Levine ..................... | B25J 9/163 |
| 2017/0252924 A1* | 9/2017 | Vijayanarasimhan ....................... G05B 13/027 |
| 2018/0272535 A1* | 9/2018 | Ogawa ................... | B25J 13/085 |
| 2018/0276501 A1* | 9/2018 | Yamada ................ | G06V 10/454 |
| 2019/0084151 A1* | 3/2019 | Bai ........................ | B25J 9/1612 |
| 2019/0099891 A1* | 4/2019 | Tomioka ................ | B25J 9/1697 |

(Continued)

FOREIGN PATENT DOCUMENTS

JP 2013-198943 A 10/2013

*Primary Examiner* — Jonathan L Sample
(74) *Attorney, Agent, or Firm* — Dinsmore & Shohl LLP

(57) ABSTRACT

A robot including a manipulator includes: an image-pickup acquisition unit configured to acquire an image of an environmental space including a target object to be grasped; and a control unit configured to control a motion performed by the robot, in which the control unit causes the robot to acquire, by the image-pickup acquisition unit, a plurality of information pieces of the target object to be grasped while it moves the robot so that the robot approaches the target object to be grasped, calculates, for each of the information pieces, a grasping position of the target object to be grasped and an index of certainty of the grasping position by using a learned model, and attempts to grasp, by moving the manipulator, the target object to be grasped at a grasping position selected based on a result of the calculation.

9 Claims, 7 Drawing Sheets

(56) References Cited

U.S. PATENT DOCUMENTS

| | | | |
|---|---|---|---|
| 2019/0126471 A1* | 5/2019 | Kobayashi | B25J 9/163 |
| 2019/0152054 A1* | 5/2019 | Ishikawa | B25J 9/163 |
| 2019/0196436 A1* | 6/2019 | Nagarajan | B25J 9/163 |
| 2019/0248003 A1* | 8/2019 | Nagarajan | B25J 9/1697 |
| 2019/0314995 A1* | 10/2019 | Wang | G05B 19/408 |
| 2020/0125872 A1* | 4/2020 | Jensen | G06V 20/59 |
| 2020/0206913 A1* | 7/2020 | Kaehler | G06V 10/82 |

* cited by examiner

ROBOT, METHOD, AND MANIPULATING SYSTEM

CROSS REFERENCE TO RELATED APPLICATIONS

This application is based upon and claims the benefit of priority from Japanese patent application No. 2018-234338, filed on Dec. 14, 2018, the disclosure of which is incorporated herein in its entirety by reference.

BACKGROUND

The present disclosure relates to a robot including a manipulator that grasps a target object to be grasped.

A mobile robot including a manipulator for grasping a target object to be grasped is known. Japanese Unexamined Patent Application Publication No. 2013-198943 discloses a technique in which a robot is stopped when it approaches a target object to be grasped to acquire information on the target object to be grasped by a visual sensor, then a recognition apparatus recognizes the target object to be grasped by using the acquired information, and a trajectory controller creates a plan for the grasping based on the result of the recognition.

SUMMARY

However, in the case where a robot is stopped to acquire information on a target object to be grasped like in the technique disclosed in Japanese Unexamined Patent Application Publication No. 2013-198943, the information on a target object to be grasped can be acquired only from a view in one direction. Consequently, a grasping position of a target object to be grasped sometimes cannot be recognized appropriately. Therefore, this technique has a problem that a success rate of grasping is not very high. Further, extra time is required to perform grasping due to the stopping of the movement of a robot for acquisition of information on a target object to be grasped.

The present disclosure has been made in view of the aforementioned background and aims to provide a robot capable of appropriately recognizing a grasping position of a target object to be grasped and then increasing a success rate of grasping, and reducing a time required for the grasping.

A first exemplary aspect is a robot including a manipulator, the robot further including: an image-pickup acquisition unit configured to acquire an image-pickup image of an environmental space including a target object to be grasped; and a control unit configured to control a motion performed by the robot, in which the control unit causes the robot to acquire, by the image-pickup acquisition unit, a plurality of image-pickup images of the target object to be grasped while it moves the robot so that the robot approaches the target object to be grasped, calculates, for information acquired from the image-pickup images, a grasping position of the target object to be grasped and an index of certainty of the grasping position by using a learned model, and attempts to grasp, by moving the manipulator, the target object to be grasped at a grasping position selected based on a result of the calculation.

When information on a target object to be grasped is acquired from only one direction thereof, there may be more desirable grasping positions in the unobservable parts of the target object to be grasped. By acquiring a plurality of information pieces of the target object to be grasped while a robot is being moved, it is possible to acquire information pieces of the target object to be grasped from the directions thereof different from each other. By doing so, the number of the unobservable parts of the target object to be grasped can be reduced compared to the case in which the information on the target object to be grasped is acquired from only one direction thereof. Thus, it is possible to appropriately recognize a grasping position of the target object to be grasped. Then, by calculating a grasping position and its likelihood from the aforementioned information pieces of the target object to be grasped using a learned model and selecting a grasping position based on a result of the calculation, it is possible to determine a grasping position at which it is estimated to be more desirable to grasp the target object to be grasped, thereby increasing a success rate of grasping. Further, the information on the target object to be grasped is acquired while the robot is being moved so as to approach the target object to be grasped, and it is thus possible to reduce a time required for grasping the target object to be grasped compared to the case in which the robot is stopped when it has approached the target object to be grasped and then the information on the target object to be grasped is acquired.

Further, the control unit may select a grasping position corresponding to a relatively high index and attempt to grasp the target object to be grasped at the selected grasping position. By selecting a grasping position corresponding to a relatively high likelihood as described above, it is possible to determine a grasping position at which it is estimated to be more desirable to grasp the target object to be grasped, thereby increasing a success rate of grasping.

Further, the control unit may attempt to grasp the target object to be grasped by moving the manipulator when the index higher than a predetermined threshold has been obtained. As described above, by terminating acquisition of the information on the target object to be grasped when the likelihood higher than a predetermined threshold has been obtained and attempting to grasp the target object, it is possible to further reduce time required for grasping.

Further, the image-pickup acquisition unit may be disposed at a position where the manipulator does not obstruct visual information on the target object to be grasped. By doing so, in the information on the target object to be grasped obtained by the image-pickup acquisition unit, it is possible to reduce the risk that a grasping position of the target object to be grasped cannot be recognized.

Further, the image-pickup acquisition unit may be disposed at a tip of the manipulator. The robot is configured so that the tip of the manipulator can be brought closest to the target object to be grasped. Accordingly, by disposing the image-pickup acquisition unit at the tip of the manipulator, it is possible to acquire the information on the target object to be grasped with a higher accuracy.

Further, the information may be image data on a three-dimensional (3D) image created by compositing a plurality of image-pickup images of the target object to be grasped acquired by the image-pickup acquisition unit.

According to the present disclosure, it is possible to appropriately recognize a grasping position of a target object to be grasped and then increase a success rate of grasping, and reduce a time required for the grasping.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, the disclosure will be described based on the following embodiment. However, the present disclosure set forth in the claims are not intended to be limited to the following embodiment. Moreover, it is not absolutely necessary to provide all the configurations to be described in the following embodiment as means for solving the problem. For the sake of clarification of the description, the following description and the drawings are omitted and simplified as appropriate.

The same elements are denoted by the same reference symbols throughout the drawings, and repetitive descriptions are avoided as necessary.

First, a configuration of a robot to which a control apparatus according to this embodiment is applied is described.

Figure 1:
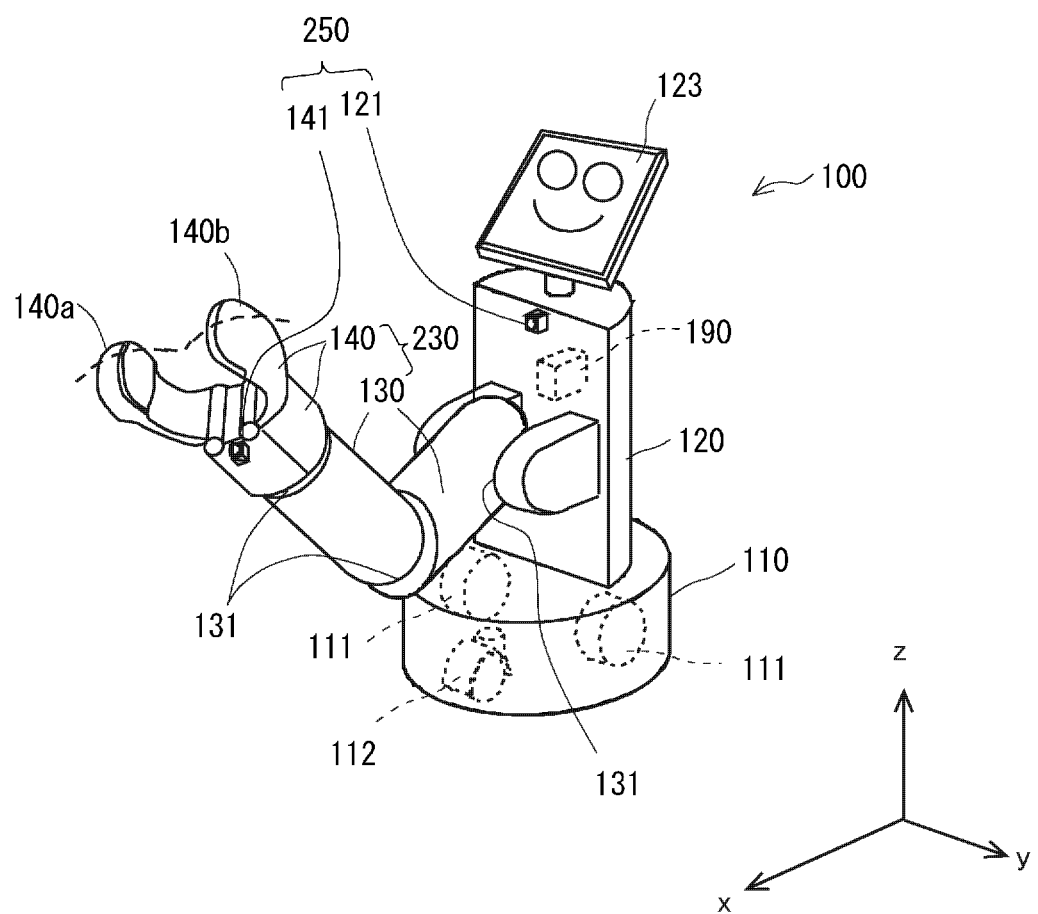
FIG. 1 is a perspective view of a robot to which a control apparatus according to an embodiment is applied.

FIG. 1 is a perspective view of a robot 100 to which the control apparatus according to this embodiment is applied. In FIG. 1, an xy plane is a traveling surface of the robot 100, and a z-axis positive direction indicates a zenith direction. As shown in FIG. 1, the robot 100 mainly includes a movable base part 110 as a moving mechanism for moving on a traveling surface, a main-body part 120, and a manipulator 230 as a grasping mechanism. The manipulator 230 includes a robot arm 130 and a robot hand 140.

The movable base part 110 supports two driving wheels 111 and a caster 112, each of which is in contact with the traveling surface, inside its cylindrical housing. The two driving wheels 111 are arranged so that the centers of their rotation axes coincide with each other. Each of the driving wheels 111 is rotationally driven by a motor (not shown) independently of each other. The caster 112 is a driven wheel and is disposed so that its pivotal axis extending from the movable base part 110 in the vertical direction axially supports the wheel at a place away from its rotation axis. Further, the caster 112 follows the movement of the movable base part 110 so as to move in the moving direction of the movable base part 110. The robot 100 goes straight forward when, for example, the two driving wheels 111 are rotated at the same rotational speed in the same direction, and turns around the vertical axis that passes the center of the two driving wheels 111 of the movable base part 110 when, for example, they are rotated at the same rotational speed in the opposite directions.

The main-body part 120 supports the robot arm 130 and includes a display panel 123 which forms a part of a user interface. The display panel 123 is, for example, a liquid-crystal panel, and displays a face of a character and shows information about the robot 100. The display panel 123 includes a touch panel on a display surface thereof, and can receive an instruction input from a user.

The robot arm 130 supported by the main-body part 120 includes a plurality of links, for example, two links as shown in FIG. 1, and may take various postures by driving an actuator provided in a joint part 131 (a wrist joint, an elbow joint, a shoulder joint, etc.) for rotatably coupling each link. A speed reduction mechanism is provided in each joint part 131. The robot hand 140 is connected to a tip of the robot arm 130, and the whole robot hand 140 can be rotated by driving an actuator around the pivotal axis parallel to the direction in which a tip link of the robot arm 130 is extended. The robot hand 140 includes a first finger 140a and a second finger 140b which are driven by an actuator provided at its tip. The first and second fingers 140a and 140b can grasp by moving so as to approach each other as indicated by dotted lines and grasping a target object. Further, a control box 190 is provided in the main-body part 120. The control box 190 includes a control unit, a memory and the like that will be described later.

An image-pickup acquisition unit 250 acquires an image-pickup image of an environmental space including a target object to be grasped. The image-pickup acquisition unit 250 is disposed at a position where the manipulator 230 does not obstruct visual information on the target object to be grasped. Note that the image-pickup acquisition unit 250 may be disposed at a tip of the manipulator 230. The robot 100 is configured so that the tip of the manipulator 230 can be brought closest to the target object to be grasped. Accordingly, by disposing the image-pickup acquisition unit 250 at the tip of the manipulator 230, it is possible to acquire information on the target object to be grasped with a higher accuracy.

The image-pickup acquisition unit 250 includes, for example, an environmental camera 121 provided at a position where an environmental space including moving ranges of the robot arm 130 and the robot hand 140 in the main-body part 120 can be observed, and a hand camera 141 provided at a tip of the robot arm 130. The environmental camera 121 and the hand camera 141 include an image pickup device which is, for example, a CMOS image sensor and an image data generating unit. The environmental camera 121 outputs image data generated by shooting an environmental space in front of it. The hand camera 141 outputs image data generated by shooting a space in front of the robot hand 140. Note that it is not necessary for the image-pickup acquisition unit 250 to include a plurality of cameras and thus it may include only one camera.

Figure 2:
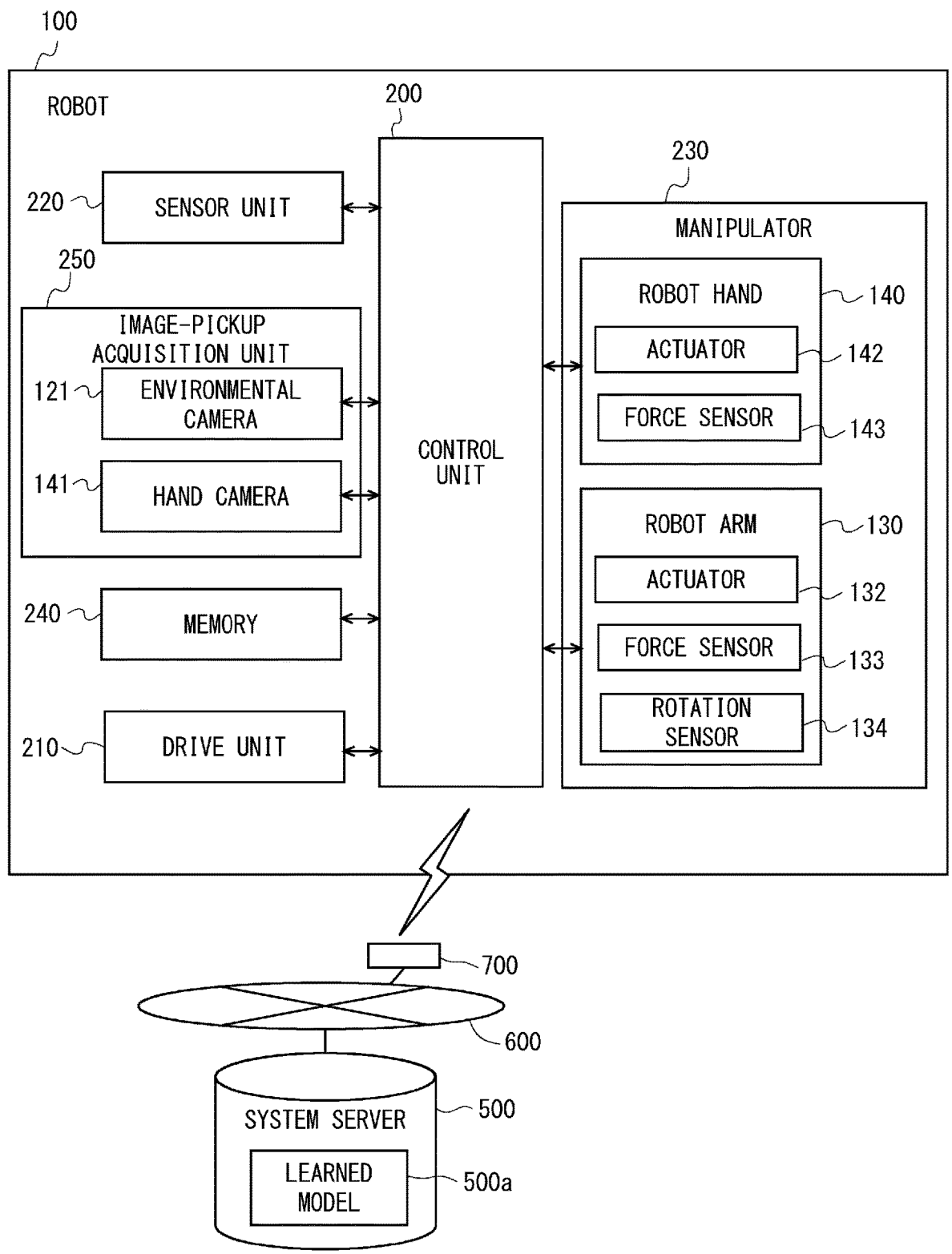
FIG. 2 is a block diagram showing a control configuration of the robot.

FIG. 2 is a block diagram showing a control configuration of the robot 100. A control unit 200 according to this embodiment is incorporated into the robot 100. That is, the control unit 200 is, for example, a CPU, and is housed in the control box 190 (see FIG. 1) of the main-body part 120. A drive unit 210 includes a drive circuit and a motor for driving the driving wheels 111 (see FIG. 1), and is provided in the movable base part 110 (see FIG. 1).

The robot arm 130 included in the manipulator 230 includes an actuator 132 for driving each joint part 131, a rotation sensor 134 for detecting rotation information on each joint part 131 (see FIG. 1), and a force sensor 133 for detecting an operation force (torque) of each joint part 131 in addition to the structure described with reference to FIG.

1. The actuator 132 is, for example, a servo motor. The rotation sensor 134 is, for example, an encoder. The force sensor 133 is, for example, a torque sensor or the like for detecting torque of each joint part 131. The robot hand 140 included in the manipulator 230 includes an actuator 142 for driving the first finger 140a and the second finger 140b (see FIG. 1), and a force sensor 143 for detecting an operation force of the robot hand 140.

A sensor unit 220 includes various sensors for detecting obstacles while moving and contact from outside, and is disposed in the movable base part 110 and the main-body part 120 (see FIG. 1) in a distributed manner. The control unit 200, by sending a control signal to the sensor unit 220, drives various sensors and acquires outputs from them.

As described above, the environmental camera 121 of the image-pickup acquisition unit 250 is used for observing the environmental space in front of it including the moving ranges of the robot arm 130 and the robot hand 140, and performs shooting in accordance with a shooting instruction from the control unit 200. The environmental camera 121 passes the generated image data to the control unit 200. As described above, the hand camera 141 is used for observing a space in front of the robot hand 140, and performs shooting in accordance with a shooting instruction from the control unit 200. The hand camera 141 passes the generated image data to the control unit 200.

A memory 240 is a nonvolatile storage medium, and for example, a solid state drive is used. The memory 240 may store, in addition to a control program for controlling the robot 100, various parameter values, functions, lookup tables and the like which are used for the control.

The control unit 200 controls a motion of the robot 100. That is, the control unit 200 performs rotation control of the driving wheels 111 by sending a driving signal to the drive unit 210. Further, the control unit controls a motion of grasping a target object to be grasped with the manipulator 230 by sending a drive signal to the actuator 132 of the robot arm 130 and the actuator 142 and the robot hand 140. The details of the motion control of the robot 100 performed by the control unit 200 will be described later.

The control unit 200 reads a learned model 500a from a system server 500 connected to an Internet 600. The control unit 200 is connected to the Internet 600 through a wireless router 700. Note that a network to which the system server 500 connects is not limited to the Internet and may be other types of networks such as an intranet.

Next, a processing procedure in which the control unit 200 controls a motion of the robot 100 grasping a target object to be grasped is described. Note that FIGS. 1 and 2 are appropriately referred to in the following description.

Figure 3:
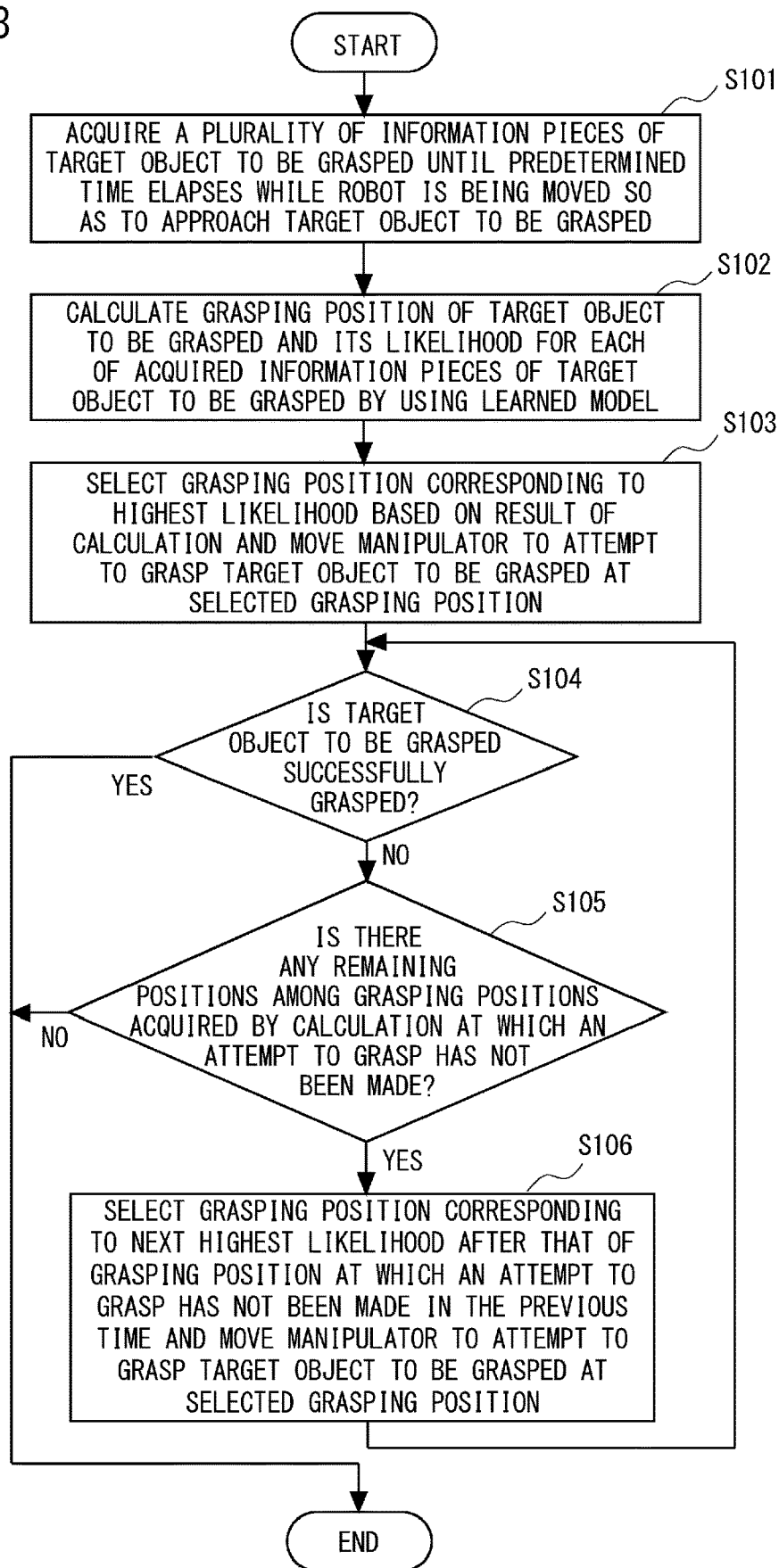
FIG. 3 is a flowchart showing a processing procedure in which the control apparatus controls a motion of the robot grasping a target object to be grasped.

FIG. 3 is a flowchart showing a processing procedure in which the control unit 200 controls a motion of the robot 100 grasping a target object to be grasped. As shown in FIG. 3, first, while the robot 100 is being moved so as to approach the target object to be grasped, a plurality of information pieces of the target object to be grasped are acquired by the image-pickup acquisition unit 250 until a predetermined time elapses (Step S101). Note that "moving the robot 100" includes all the following cases: a case of driving only the movable base part 110 as a moving mechanism; a case of driving only the manipulator 230 as a grasping mechanism; and a case of driving both the movable base part 110 and the manipulator 230.

Subsequent to Step S101, a grasping position of a target object to be grasped and a likelihood that is an index of certainty of the grasping position are calculated for each of the acquired information pieces of the target object to be grasped by using a learned model (Step S102). Note that a maximum likelihood estimation method is used for the learned model. The maximum likelihood estimation method calculates a parameter that maximizes a likelihood function, and a likelihood thereof. The likelihood is an index indicating the degree of the certainty of the parameter calculated from the acquired information on the target object to be grasped. Note that a parameter to be calculated is a grasping position, and the likelihood indicates the degree of the certainty of the calculated grasping position. Next, the grasping position corresponding to the highest likelihood is selected based on a result of the calculation performed in Step S102, and the manipulator 230 is moved to attempt to grasp the target object to be grasped at the selected grasping position (Step S103).

Subsequent to Step S103, it is determined whether the target object to be grasped is successfully grasped (Step S104). When it is determined in Step S104 that the target object to be grasped is successfully grasped, the process is ended. When it is determined in Step S104 that the target object to be grasped is not successfully grasped, it is determined whether there are any remaining grasping positions among the grasping positions acquired by the calculation performed in Step S102 at which an attempt to grasp has not been made (Step S105).

When it is determined in Step S105 that there are no remaining grasping positions among the grasping positions acquired by the calculation performed in Step S102 at which an attempt to grasp has not been made, the process is ended. When it is determined in Step S105 that there are grasping positions among the grasping positions acquired by the calculation performed in Step S102 at which an attempt to grasp has not been made, the grasping position corresponding to the next highest likelihood after that of the grasping position at which an attempt to grasp has been made in the previous time is selected, and the manipulator 230 is moved to attempt to grasp the target object to be grasped at the selected grasping position (Step S106). Then, the process returns to Step S104. As described above, the control unit 200 may select a grasping position corresponding to the relatively high likelihood and attempts to grasp the target object to be grasped at the selected grasping position.

Next, an example of a learning method of the learned model used in Step S102 of FIG. 3 is described. Note that the learned model 500a (see FIG. 2) is, for example, a neural network. Further, as described above, a maximum likelihood estimation method is used for the learned model.

Figure 4:
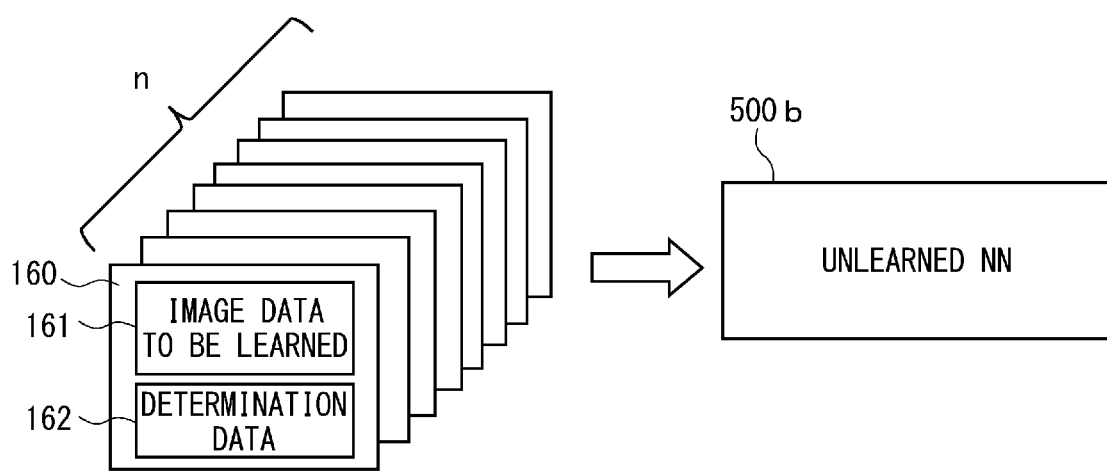
FIG. 4 is a schematic diagram for explaining, by using supervised learning as an example, a method for causing an unlearned neural network to learn.

FIG. 4 is a schematic diagram for explaining, by using supervised learning as an example, a method for causing an unlearned neural network (hereinafter referred to as an "unlearned NN 500b" or the like) to learn. Note that supervised learning is a method in which a large number of training data sets composed of a combination of data (input) to be learned and its correct answer (output) are given in advance when the data to be learned has the predetermined correct answer so that a relation between the input and the output is learned.

As shown in FIG. 4, a training data set 160 composed of a combination of an image data 161 to be learned as an input and a determination data 162 as an output is given the unlearned NN 500b. Note that the image data 161 to be learned is image, data on various types of target objects to be grasped, and the determination data 162 is data on desirable grasping positions corresponding to the respective target objects to be grasped. A plurality of training data sets 160 are acquired in advance, for example, by a person operating the robot 100 with a teaching pendant or the like and causing the robot 100 to repeat a motion of grasping the target object to be grasped. By doing so, the unlearned NN 500b learns a relation between the image data 161 to be learned and the determination data 162 in the grasping motion of the target object to be grasped. Increasing an acquisition number n of the training data set 160 enables the determination accuracy of the learned model 500a to be improved.

Next, a process in Step S101 of FIG. 3 is described more specifically.

Figure 5:
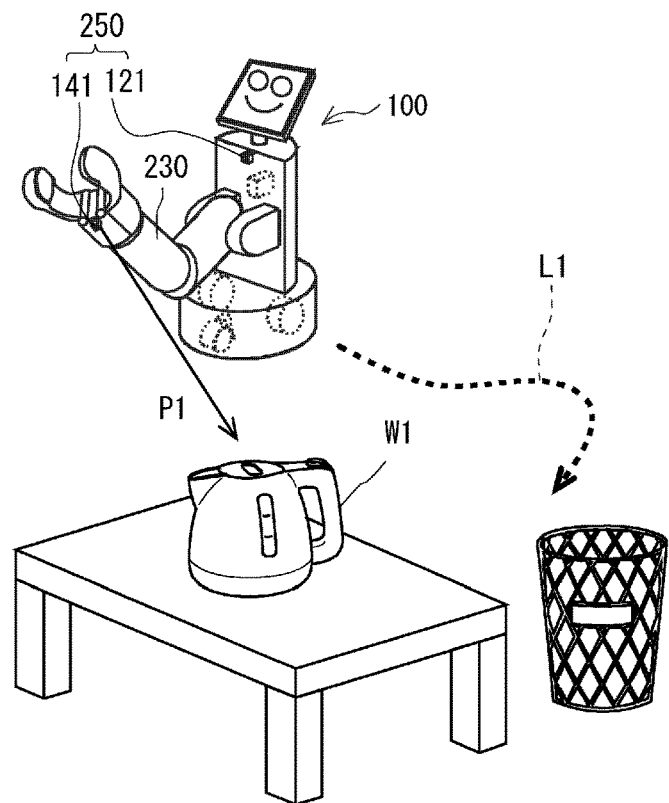
FIG. 5 is a schematic diagram for explaining a process in Step S101 of FIG. 3 more specifically.
Figure 5:
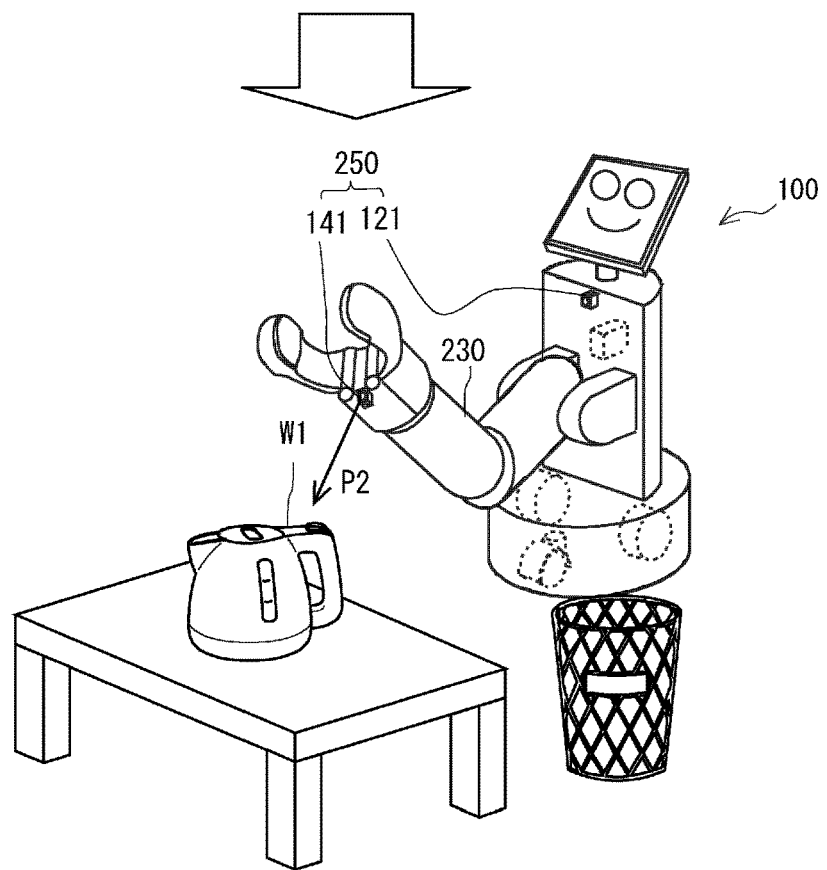

FIG. 5 is a schematic diagram for explaining the process in Step S101 of FIG. 3 more specifically. As shown in the upper section of FIG. 5, the control unit 200 (see FIG. 2) of the robot 100 causes the image-pickup acquisition unit 250 to acquire information on a target object W1 to be grasped at a position where the robot 100 has started to be moved in order to approach the target object to be grasped. At this time, image data is acquired in which the target object W1 to be grasped is shot from a direction indicated by an arrow P1. The robot 100 approaches the target object to be grasped along a route L1, which is acquired from a route plan, indicated by a dashed line. Note that a known method such as a Rapidly-exploring Random Tree (RRT) can be used for the route plan. Then, the control unit 200, while it moves the robot 100 along the route L1, causes the image-pickup acquisition unit 250 to acquire a plurality of information pieces of the target object to be grasped until a predetermined time elapses. A predetermined time is set in advance, for example, by a user.

As shown in the lower section of FIG. 5, image data is acquired in which the target object W1 to be grasped is shot from a direction indicated by an arrow P2 that is different from that indicated by the arrow P1 while the robot 100 is being moved along the route L1. As described above, while the robot 100 is being moved along the route L1, image data is acquired in which the target object W1 to be grasped is shot from each of a plurality of directions different from each other.

When a grasping position at which it is estimated to be desirable to grasp the target object W1 to be grasped is determined by only using the image data in which the target object W1 to be grasped is shot from one direction thereof, there may be more desirable grasping positions in the unobservable parts of the target object W1 to be grasped. By determining a grasping position at which it is estimated to be desirable to grasp the target object W1 to be grasped by using the image data pieces in which the target object W1 to be grasped is shot from a plurality of respective directions different from each other, the number of the unobservable parts in the target object W1 to be grasped can be reduced. It is thus possible to appropriately recognize a grasping position of the target object to be grasped.

Further, in the robot 100, information on the target object W1 to be grasped is acquired while the robot 100 is being moved in order to approach the target object W1 to be grasped. It is thus possible to reduce a time required for grasping the target object to be grasped compared to the case in which the robot is stopped when it has approached the target object to be grasped and then information on the target object to be grasped is acquired.

Figure 6:
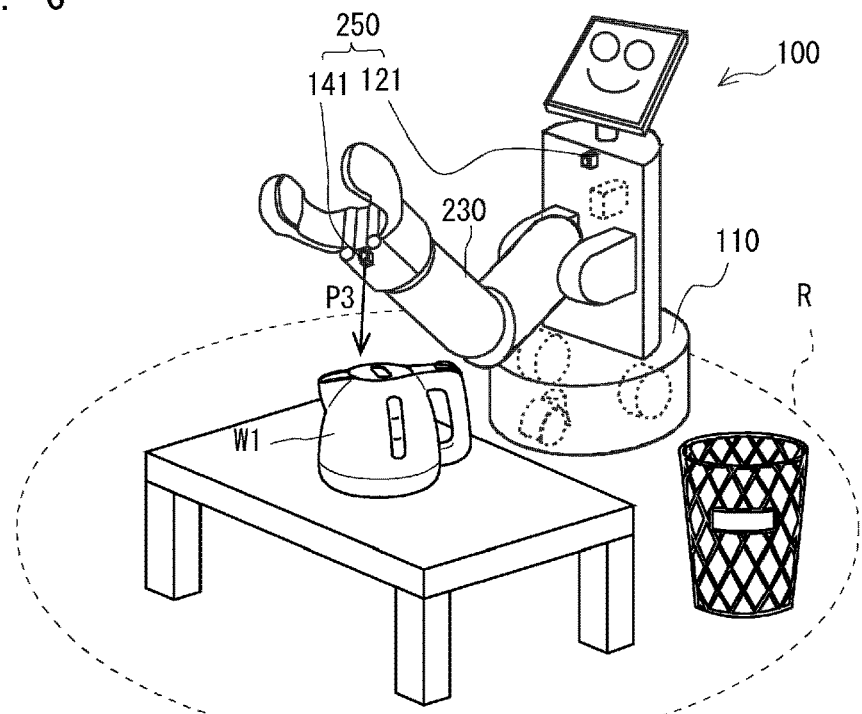
FIG. 6 is a schematic diagram showing an example in which the robot acquires information on the target object to be grasped while it approaches within a range where it can grasp the target object to be grasped.
Figure 6:
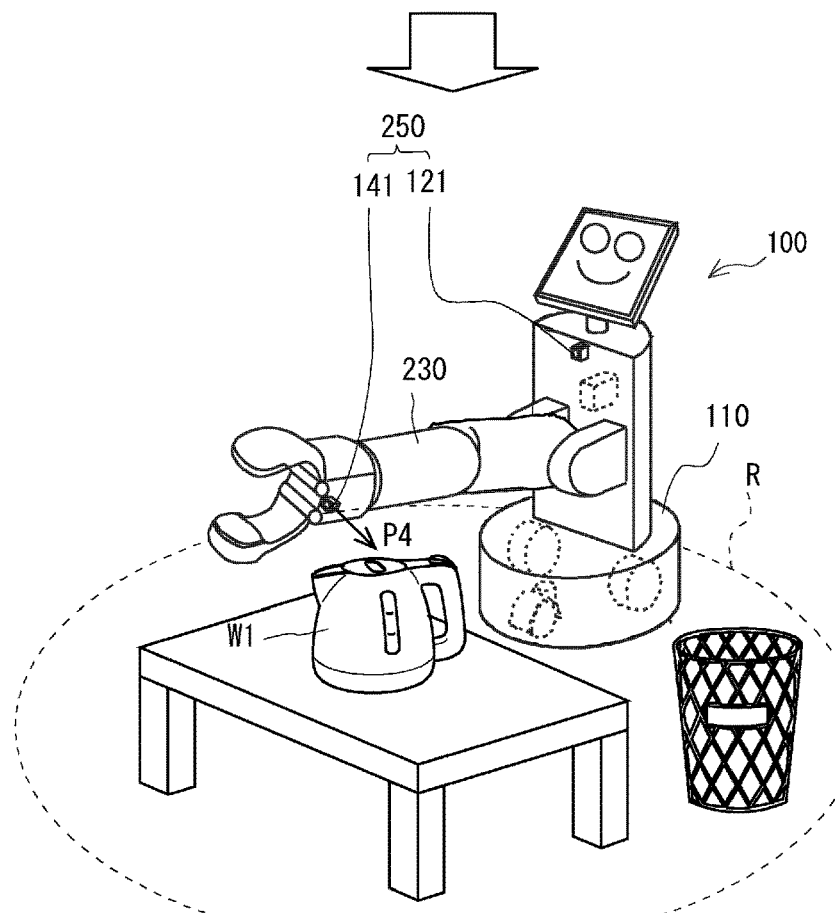

Note that when the robot 100 has approached within a range where it can grasp the target object W1 to be grasped but a predetermined time does not elapse, the robot 100 is moved within the range where it can grasp the target object W1 to be grasped until the predetermined time elapses so that information on the target object W1 to be grasped is acquired by the image-pickup acquisition unit 250. FIG. 6 is a schematic diagram showing an example in which the robot 100 acquires information on the target object W1 to be grasped while the robot 100 approaches the range where it can grasp the target object W1 to be grasped. In FIG. 6, a region R surrounded by a dashed line indicates the range where the robot 100 can grasp the target object W1 to be grasped.

As shown in the upper section of FIG. 6, image data is acquired in which the target object W1 to be grasped is shot by the hand camera 141 of the image-pickup acquisition unit 250 from a direction indicated by an arrow P3 while the robot 100 approaches within a range R where it can grasp the target object W1 to be grasped. In this state, the manipulator 230 is moved to change a position of the hand camera 141. By doing so, as shown in the lower section of FIG. 6, image data is acquired in which the target object W1 to be grasped is shot by the hand camera 141 of the image-pickup acquisition unit 250 from a direction indicated by an arrow P4 that is different from that indicated by the arrow P3. Note that the movement of the robot 100 within the range R where it can grasp the target object W1 to be grasped may be performed either by driving only the manipulator 230, by driving only the movable base part 110, and by driving both the manipulator 230 and the movable base part 110.

Modified Example 1

A modified example of the processing procedure in which the control unit 200 of the robot 100 controls a motion of the robot 100 grasping a target object to be grasped, which has been described with reference to FIG. 3, is described. Note that FIGS. 1 and 2 are appropriately referred to in the following description.

In this modified example, the control unit 200 attempts to grasp the target object to be grasped by moving the manipulator 230 when a grasping position having a likelihood higher than a predetermined threshold has been acquired. By doing so, it is possible to further reduce time required for grasping.

Figure 7:
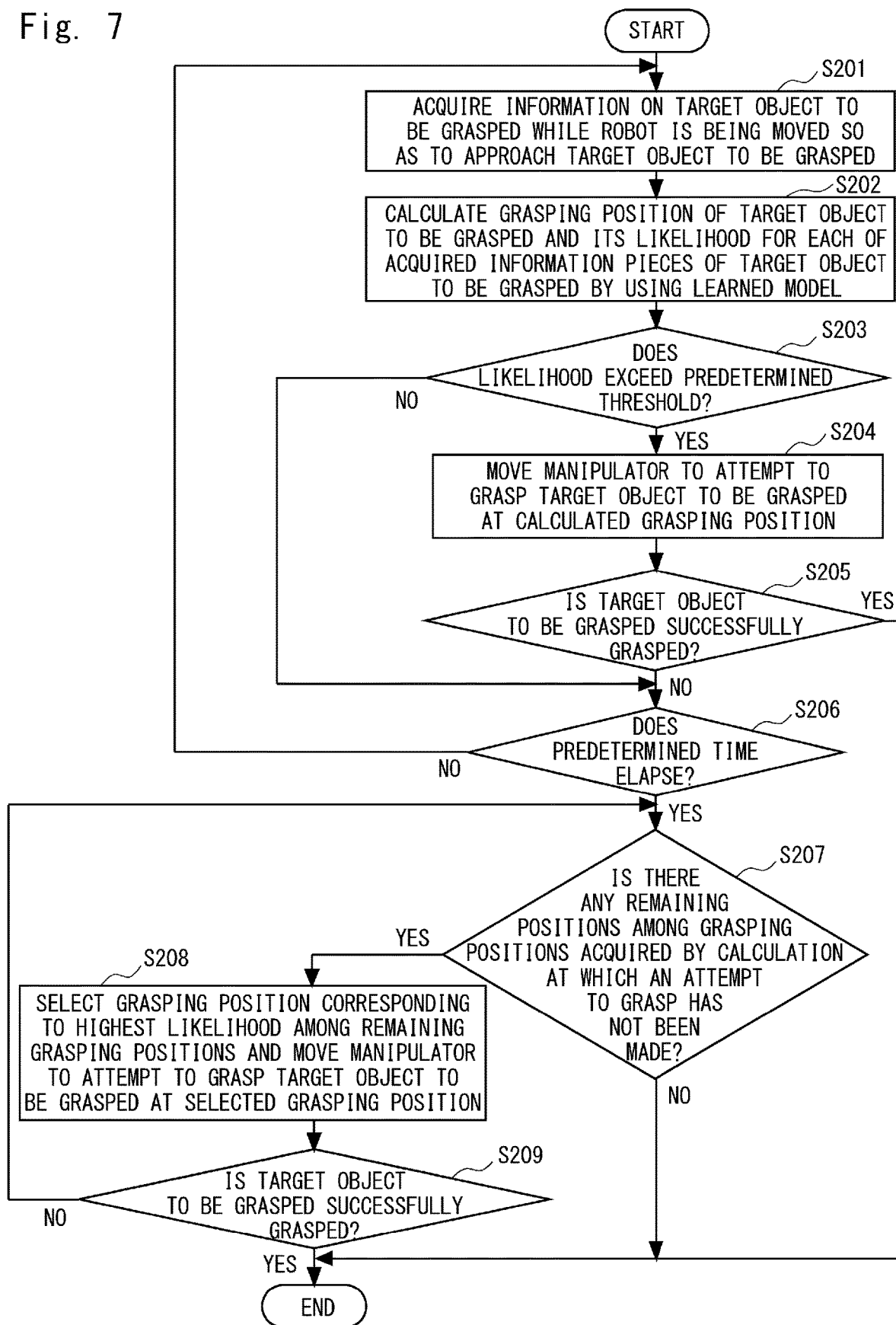
FIG. 7 is a flowchart for explaining a modified example 1 of a processing procedure in which a control unit controls a motion of the robot grasping a target object to be grasped.

FIG. 7 is a flowchart for explaining the modified example of the processing procedure in which the control unit 200 controls a motion of the robot 100 grasping the target object to be grasped. As shown in FIG. 7, first, while the robot 100 is being moved so as to approach the target object to be grasped, information on the target object to be grasped is acquired by the image-pickup acquisition unit 250 (Step S201).

Subsequent to Step S201, a grasping position of a target object to be grasped and a likelihood that is an index of certainty of the grasping position are calculated for the acquired information by using a learned model (Step S202). Next, it is determined whether the likelihood exceeds a predetermined threshold (Step S203). Note that a predetermined threshold is set in advance, for example, by a user.

When it is determined that the likelihood exceeds a predetermined threshold in Step S203, the manipulator 230 is moved to attempt to grasp the target object to be grasped at the calculated grasping position (Step S204). Next, it is determined whether the target object to be grasped is successfully grasped (Step S205). When it is determined in Step S205 that the target object to be grasped is successfully grasped, the process is ended. When it is determined that the target object to be grasped is not successfully grasped in Step S205, it is determined whether a predetermined time elapses (Step S206). When it is determined that a predetermined time does not elapse in Step S206, the process returns to Step S201. When it is determined that a predetermined time elapses in Step S206, it is determined whether there are any remaining grasping positions among the grasping positions acquired by the calculation at which an attempt to grasp has not been made (Step S207).

When it is determined in Step S207 that there are remaining grasping positions among the grasping positions acquired by the calculation at which an attempt to grasp has not been made, the grasping position corresponding to the highest likelihood is selected among the remaining grasping positions, and the manipulator 230 is moved to attempt to grasp the target object to be grasped at the selected grasping position (Step S208). Next, it is determined whether the target object to be grasped is successfully grasped (Step S209). When it is determined that the target object to be grasped is not successfully grasped in Step S209, the process returns to Step S207. When it is determined that the target object to be grasped is successfully grasped in Step S209, the process is ended.

As described above, in the robot 100 according to this embodiment, a plurality of information pieces of the target object to be grasped are acquired while the robot is being moved. By doing so, it is possible to acquire the information on the target object to be grasped from the directions thereof different from each other.

Accordingly, the number of the unobservable parts of the target object to be grasped can be reduced compared to the case in which the information on the target object to be grasped is acquired from only one direction thereof. It is thus possible to appropriately recognize a grasping position of the target object to be grasped. Then, the robot 100 calculates, from the information pieces of the target object to be grasped acquired from a plurality of different directions, the respective grasping positions and likelihoods by using a learned model, and then the grasping position is selected at which grasping is attempted based on a result of the calculation. By doing so, it is possible to determine a grasping position at which it is estimated to be more desirable to grasp the target object to be grasped, thereby increasing a success rate of grasping. Further, the information on the target object to be grasped is acquired while the robot 100 is being moved so as to approach the target object to be grasped, and it is thus possible to reduce a time required for grasping the target object to be grasped compared to the case in which the robot is stopped when it has approached the target object to be grasped and then the information on the target object to be grasped is acquired.

Note that the present disclosure is not limited to the above-described embodiments and they can be modified as desired without departing from the scope and spirit of the disclosure. A configuration example in which a learned model is stored in a system server outside a robot has been described in the aforementioned embodiments. However, a configuration is not limited to the above example and may be, for example, a configuration in which a learned model is stored in a memory (e.g., the memory 240 in FIG. 2) mounted on a robot.

A control unit may create a 3D image of a target object to be grasped by compositing a plurality of image-pickup images of the target object to be grasped acquired while it moves a robot 100, then select a grasping position of the target object to be grasped based on the created 3D image. The control unit creates a 3D image, for example, every time a predetermined number of image-pickup images of the target object to be grasped are acquired, or every time a predetermined time elapses. The control unit calculates, by using a learned model, a grasping position of the target object to be grasped and an index of certainty of the grasping position such as a likelihood for each of the created 3D images. The learned model here is a learned model for 3D images (hereinafter referred to as a "3D-image learned model") different from a learned model 500a (see FIG. 2) receiving image data on a plurality of image-pickup images of the target object to be grasped which are acquired while the robot 100 is being moved. The 3D-image learned model is, for example, a neural network, and a large number of training data sets, which are composed of a combination of data (input) of a 3D image to be learned and the grasping position (output), are given to the 3D-image learned model in advance so that the 3D-image learned model learns a relation between the input and the output. The data on the 3D image input to the learned model may be data in which three-dimensional coordinate data is converted into a form that facilitates calculation processing (e.g., data in which three-dimensional coordinates are converted into polar coordinates). Then, the control unit may select a grasping position corresponding to the relatively high likelihood and attempt to grasp the target object to be grasped at the selected grasping position by moving a manipulator. By doing so, it is possible to more appropriately recognize the grasping position of the target object to be grasped.

While an index of certainty of a grasping position that is calculated by using a learned model is a likelihood in the aforementioned embodiments, it is not limited to this. An index of certainty of a grasping position may be, for example, discrete ranking such as a rank A, a rank B, . . . , or binary classification such as yes or no. Note that when discrete ranking or binary classification is used for an index of certainty of a grasping position, the control unit selects a grasping position at which it has most recently been determined that it is preferable to grasp and attempts to grasp a target object to be grasped.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot comprising a manipulator, the robot further comprising:
   an image-pickup acquisition unit configured to acquire an image-pickup image of an environmental space including a target object to be grasped; and
   a control unit configured to control a motion performed by the robot, wherein
   the control unit
      causes the robot to acquire, by the image-pickup acquisition unit, a plurality of image-pickup images of the target object to be grasped while it moves the robot so that the robot approaches the target object to be grasped,
      calculates, for information acquired from the image-pickup images, a plurality of grasping positions of the target object to be grasped and indices of certainty of the grasping positions by using a learned model, the learned model receiving the information acquired from the image-pickup images and outputting the plurality of grasping positions of the target object to be grasped and indices of certainty of the grasping positions,
      attempts to grasp, by moving the manipulator, the target object to be grasped at a grasping position selected among the plurality of grasping positions based on a result of the calculation, and determines whether there are remaining grasping positions on the target object at which an attempt to grasp has not been made, wherein the grasping positions are on the target object where the target object is to be grasped.

2. The robot according to claim 1, wherein the control unit preferentially selects the grasping position corresponding to a relatively high index and attempts to grasp the target object to be grasped at the selected grasping position.

3. The robot according to claim 1, wherein the control unit attempts to grasp the target object to be grasped by moving the manipulator when at least one of the indices higher than a predetermined threshold has been obtained.

4. The robot according to claim 1, wherein the image-pickup acquisition unit is disposed at a tip of the manipulator.

5. The robot according to claim 1, wherein the information is image data on a 3D image created by compositing a plurality of image-pickup images of the target object to be grasped acquired by the image-pickup acquisition unit.

6. A method for controlling a robot comprising an image-pickup acquisition unit configured to acquire an image-pickup image of an environmental space including a target object to be grasped, and a manipulator, the method comprising:

causing the robot to acquire, by the image-pickup acquisition unit, a plurality of image-pickup images of the target object to be grasped while the robot is moved so as to approach the target object to be grasped;

calculating, for information acquired from the image-pickup images, a plurality of grasping positions of the target object to be grasped and indices of certainty of the grasping positions by using a learned model, the learned model receiving the information acquired from the image-pickup images and outputting the plurality of grasping positions of the target object to be grasped and indices of certainty of the grasping positions;

attempting to grasp, by moving the manipulator, the target object to be grasped at a grasping position selected among the plurality of grasping positions based on a result of the calculation; and determining whether there are remaining grasping positions on the target object at which an attempt to grasp has not been made, wherein the grasping positions are on the target object where the target object is to be grasped.

7. A manipulating system comprising a manipulator, the manipulating system further comprising:

an image-pickup acquisition unit configured to acquire an image-pickup image of an environmental space including a target object to be grasped; and a control unit configured to control a motion performed by the manipulating system, wherein the control unit causes the manipulating system to acquire, by the image-pickup acquisition unit, a plurality of image-pickup images of the target object to be grasped while it moves the manipulating system so that the manipulating system approaches the target object to be grasped, calculates, for information acquired from the image-pickup images, a plurality of grasping positions of the target object to be grasped and indices of certainty of the grasping positions by using a learned model, the learned model receiving the information acquired from the image-pickup images and outputting the plurality of grasping positions of the target object to be grasped and indices of certainty of the grasping positions, attempts to grasp, by moving the manipulator, the target object to be grasped at a grasping position selected among the plurality of grasping positions based on a result of the calculation, and determines whether there are remaining grasping positions on the target object at which an attempt to grasp has not been made, wherein the grasping positions are on the target object where the target object is to be grasped.

8. The robot according to claim 1, wherein the control unit determines that there are remaining grasping positions on the target object where an attempt to grasp has not been made, and determines a next grasping position on the target object to be grasped among the remaining grasping positions when the target object is not successfully grasped at the grasping position.

9. The robot according to claim 1, wherein the control unit determines a predetermined time elapses when the target object is not successfully grasped at the grasping position, and determines remaining grasping positions on the target object when the predetermined time elapses.

* * * * *